Patented Feb. 23, 1932

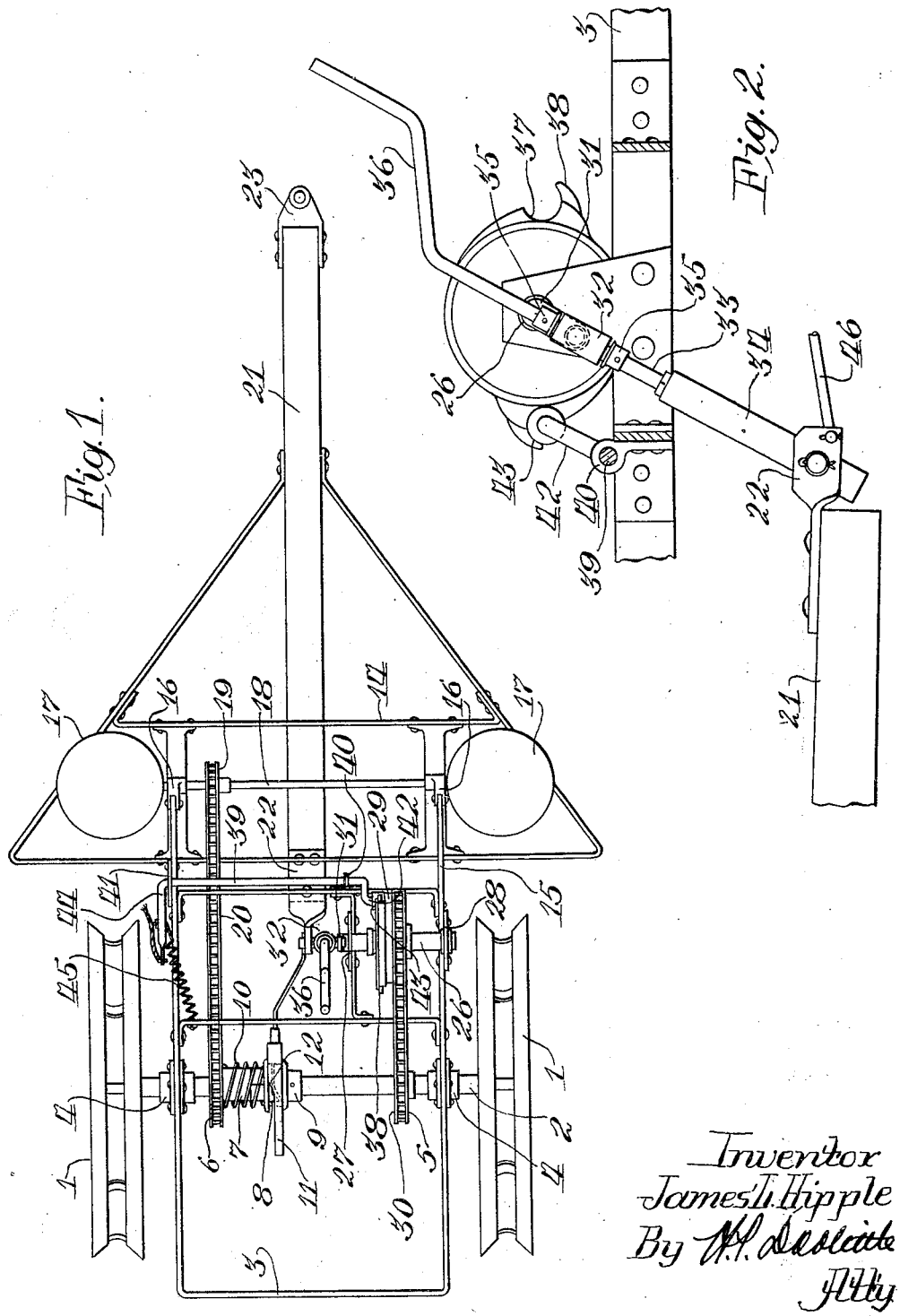

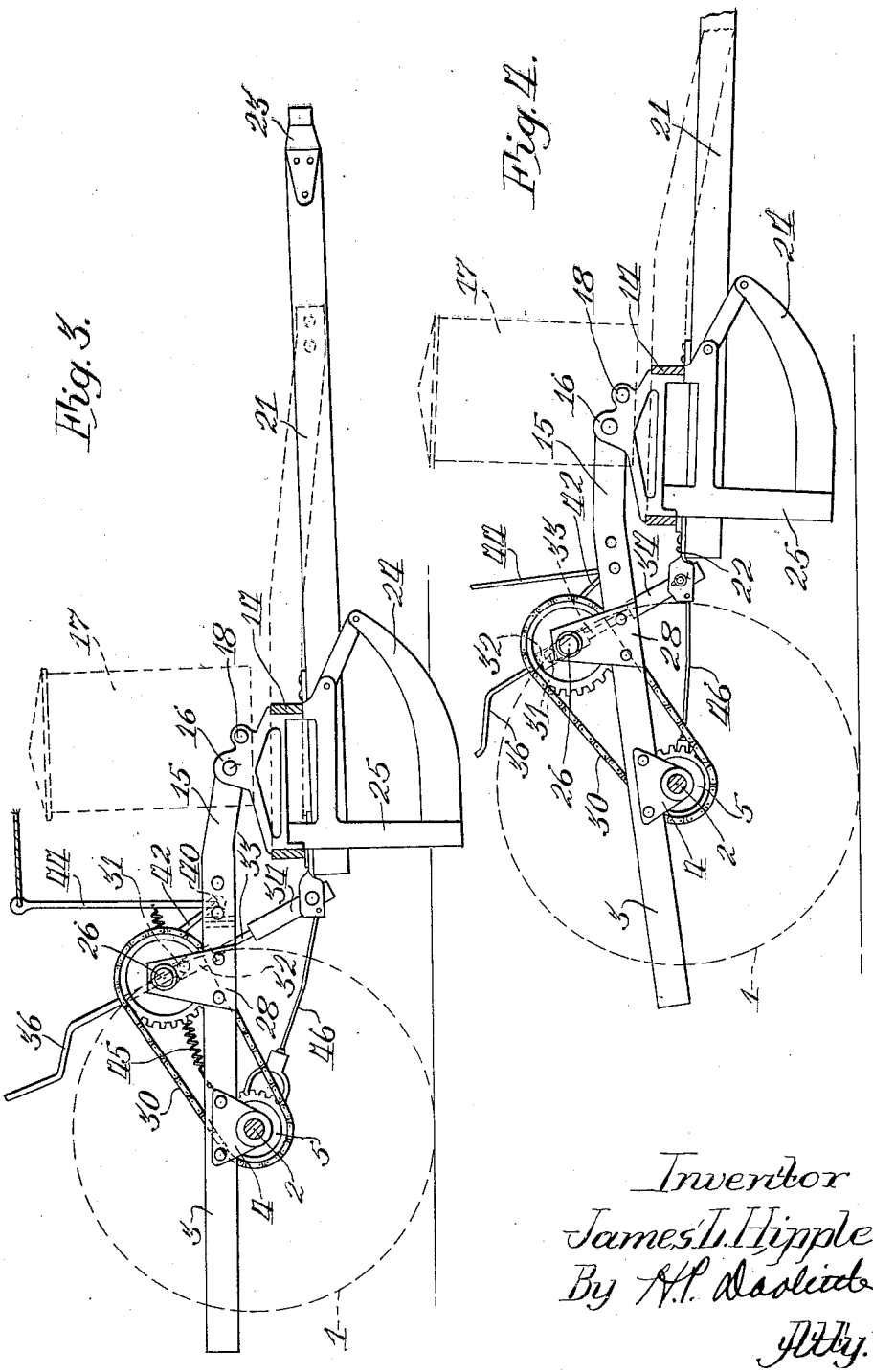

1,846,487

UNITED STATES PATENT OFFICE

JAMES L. HIPPLE, OF CANTON, ILLINOIS, ASSIGNOR TO INTERNATIONAL HARVESTER COMPANY, A CORPORATION OF NEW JERSEY

POWER LIFT PLANTER

Application filed December 5, 1929. Serial No. 411,749.

This invention relates to a corn planter. More particularly it relates to a power actuated lift for lowering the planter into and raising it out of operative position.

The principal object of the invention is to construct an improved planter particularly adapted to be drawn by and operated from a tractor.

Another object is to incorporate into the planter construction a power operated, manually controlled lifting and lowering means. These and other objects which will be apparent, are accomplished by the improved and novel construction illustrated and described in the following detailed description.

In the drawings:

Figure 1 is a plan view, showing a corn planter embodying the invention;

Figure 2 is an enlarged elevation of the lifting mechanism and the means by which it is attached to the planter frames;

Figure 3 is an elevation showing the lifting mechanism and the associated parts of the planter with the planter in lowered or operative position; and, Figure 4 shows the same elements as does Figure 3 with the planter raised out of operative position.

The drawings show a corn planter, the major portion of which is of a conventional construction. Driving and supporting wheels 1 are mounted on a live axle 2 and are adapted to rotate said axle. A rear planter frame 3, rectangular in shape, is mounted on the axle by means of a pair of bearing blocks 4 on opposite sides of the frame. The axle 2 carries a rigidly attached chain sprocket 5 for driving the lifting mechanism, as will hereinafter be described.

A second chain sprocket 6 is integrally attached to a sleeve 7 which is adapted to freely rotate on the axle 2. A clutch member 8 is mounted on the sleeve 7 for rotation therewith and for axial movement with respect thereto. A second clutch member 9 shaped to engage the clutch member 8 is rigidly secured to the axle 2 for rotation therewith. A spring 10 surrounding the sleeve 7 resiliently presses the clutch member 8 into engagement with the clutch member 9. A yoke 11 is adapted to be operated horizontally between the clutch members 8 and 9. The yoke 11 is provided with a raised cam portion 12, which separates the collars 8 and 9 axially and disengages them, thereby allowing the axle 2 to rotate without rotation of the chain sprocket 6.

The rear frame 3 is pivotally secured to a front frame 14 by forwardly extending bars 15 pivoted to upstanding lugs 16 on the front frame.

The front frame carries seed boxes 17 and planting mechanism of any conventional design adapted to be driven by a rotating seed shaft 18. The seed shaft 18 carries a sprocket 19 which is driven by a chain 20 from the chain sprocket 6. A draft beam or tongue 21 is rigidly secured to the front frame and extends rearwardly therefrom. A plate 22 is fixed on the rearward extension of the draft beam and is provided with a vertical portion on which the lifting and lowering mechanism is pivoted, as will hereinafter be described. A link 46 pivotally connects the plate 22 with the clutch operating collar 12. A clevis 23 is secured to the front of the draft beam for attachment to the drawbar of a tractor.

The front frame carries shoes 24 and grain tubes 25 communicating therewith for delivery of seed in the trenches formed by the shoes.

The lowering and lifting mechanism embodied in the planter construction comprises a clutch, such as described and claimed in the United States Patent No. 1,561,611. The clutch is mounted on the rear frame with driving and operating connections as hereinafter described.

A shaft 26 is mounted on supports 27 and 28 rigidly secured to the rear frame at a forward position. The shaft carries the normally stationary portion 28 of the clutch which is rigidly secured to the shaft. The continuously rotating portion 29 of the clutch is mounted for free rotation on the shaft 26 except when engaged for operation. The rotating portion 29 of the clutch carries a chain sprocket in alignment with the chain sprocket 5 on the axle and is driven therefrom by a chain 30.

The shaft 26 is provided with a crank 31 at the inner end. A bearing block 32 is mounted on the end of the crank. A connecting rod 33 extends radially with respect to the shaft 2 through the bearing block 32 and is threaded into a connecting pivot block 34. The connecting block 34 is pivotally secured on a transverse horizontal axis to the plate 22 on the rearward extension of the draft beam. Sleeves 35 are rigidly secured to the rod 33 above and below the bearing block 32. An extension 36 on the rod 33 is shaped to form a crank handle by which the operator may screw the rod into and out of the connecting block 34, thereby altering the distance between the crank and the pivot point on the draft beam.

As clearly described in Patent No. 1,561,611 previously referred to, the normally stationary portion 28 of the clutch has a pair of notches 37 located diametrically opposite on said portion of the clutch. Arms 38 projecting from the clutch across the notches 37 form a part of the clutch operating mechanism. A rockshaft 39 extends across the front of the rear planter frame. It is secured on the frame by suitable brackets 40 and 41, which permit oscillating movement of the shaft. Adjacent the clutch the shaft 39 has a crank 42 provided with a roller 43 positioned to seat in the notches 37 on the clutch and to actuate the lever arms 38 projecting therefrom. The other end of the rockshaft 39 has a lever extension 44 adapted to be operated by means, such as a rope or cable, extending to the tractor to which the planter is attached. A spring 45 attached to the rear frame 3 and to the lever arm 44 constantly urges the crank 42 against the clutch.

In the operation of this device, the forward end of the draft beam is mounted on a tractor drawbar or on a suitable truck, and the planter is drawn at the desired speed. The rotating axle 2 drives the chain sprocket 5, and, through the chain 30, continuously rotates the member 29 of the clutch.

The rockshaft 39 is manually operated by any suitable means leading to the tractor operator's seat. When the crank 42 is oscillated away from engagement in the notch 37, the clutch mechanism is actuated and the shaft 26 is rotated. The crank 31 is rotated to a position diagrammatically opposite, at which point the roller 43, pressed into engagement by the spring 45 on the lever at the opposite end of the shaft 39, actuates the lever arm 38 and disengages the clutch. It will be seen by this operation that the rear end of the draft beam may be raised or lowered a distance equivalent to twice the radius of the crank 31. As shown in Figures 3 and 4, the front and rear frames of the planter are so pivoted with respect to each other and the pivot point on the rear extension of the draft beam is so located that the planter shoes may be lifted out of operative position and above the ground level by the actuation of the crank 31 by the clutch. It will be noted that the normal position of the crank 31 either in lowered or raised position is on a center line passing through the shaft 26 to which the crank is rigidly attached. By use of this construction there is little or no tendency by forces transmitted through the connecting rod 33 to rotate the crank and the associated parts of the clutch.

The vertical adjustment of the planter to take care of planting depths may be altered by adjusting the length of the connecting rod 33 by rotation of the crank extension 36.

When the front frame is lowered to operative position, the seeding mechanism is also rendered operative. The link 46 withdraws the clutch operating yoke 11 and allows the spring 10 to engage the clutch members 8 and 9. The chain sprocket 6 is then rotated and drives the seed shaft 18 through the chain 20 and the chain sprocket 19.

It is to be understood that applicant contemplates as his invention any embodiment wherein his novel construction as herein described and claimed may be utilized.

What is claimed is:

1. In a grain planter, a front frame, a rear frame pivotally mounted at its forward end on the front frame, power actuated means including a clutch mechanism for altering the relative position of the frames, and manually controlled means for rendering the clutch mechanism operative.

2. In a grain planter, a front frame, a rear frame pivotally mounted at its forward end on the front frame, means for altering the relative position of said frames comprising a crank shaft mounted for rotation on the rear frame, a link connecting the crank on said shaft with the front frame, and manually engaged traction operated means for rotating the crank shaft a predetermined distance.

3. In a grain planter, a supporting and driving axle, wheels secured to and adapted to rotate said axle, a rear frame pivotally mounted on the axle, a front frame on which the rear frame is pivotally mounted, a draft beam rigidly connected to the front frame, means for altering the relative position of the frames and vertically altering the position of the front frame comprising a crank shaft mounted for rotation on the rear frame, an actuating link pivotally joining the crank on said shaft with the front frame, means for rotating the crank shaft a predetermined distance consisting of a power actuated clutch driven from the axle, and manually controlled means for engaging said clutch.

4. In a grain planter, a supporting and driving axle, wheels secured to and adapted to rotate said axle, a rear frame pivotally mounted on the axle, a front frame on which the rear frame is pivotally mounted, a draft beam rigidly connected to the front frame, means for altering the position of the front frame comprising a crank shaft mounted for rotation on the rear frame, an actuating link pivotally joining the crank on said shaft with the front frame, means for rotating the crank shaft a predetermined distance consisting of a continuously rotated member mounted on said shaft, and manually operable means for clutching said member to said shaft.

5. In a grain planter, a supporting and driving axle, wheels secured to and adapted to rotate said axle, a rear frame pivotally mounted on the axle, a front frame on which the rear frame is pivotally mounted at its forward end, a draft beam rigidly secured to the front frame and having an extension under the rear frame, means for altering the relative position of the frames and vertically adjusting the position of the front frame comprising a crank shaft mounted for rotation on the rear frame, an actuating link pivotally joining the crank on said shaft with the extension of the draft beam, and manually controlled power actuated means for rotating the crank shaft a predetermined distance.

6. In a grain planter, a supporting and driving axle, wheels secured to and adapted to rotate said axle, a rear frame pivotally mounted on the axle, seeding mechanism carried on the front frame and adapted to be driven by the driving axle, a front frame on which the rear frame is pivotally mounted at its forward end, a draft beam rigidly secured to the front frame and having an extension under the rear frame, means for altering the relative position of the frames and vertically adjusting the position of the front frame comprising a crank shaft mounted for rotation on the rear frame, an actuating link pivotally joining the crank on said shaft with the extension of the draft beam, manually controlled power actuated means for rotating the crank shaft a predetermined distance, and means for rendering the seeding mechanisms inoperative when the front frame is raised out of operative position.

In testimony whereof I affix my signature.

JAMES L. HIPPLE.